US010977567B2

(12) United States Patent
Cama et al.

(10) Patent No.: US 10,977,567 B2
(45) Date of Patent: *Apr. 13, 2021

(54) AUTOMATED VEHICULAR ACCIDENT DETECTION

(71) Applicant: INTERNATIONAL BUSINESS MACHINES CORPORATION, Armonk, NY (US)

(72) Inventors: Karl J. Cama, Coppell, TX (US); Norbert Herman, Denver, CO (US); Shubhadip Ray, Somerset, NJ (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 15/912,788

(22) Filed: Mar. 6, 2018

(65) Prior Publication Data
US 2018/0197093 A1  Jul. 12, 2018

Related U.S. Application Data

(63) Continuation of application No. 14/732,836, filed on Jun. 8, 2015, now Pat. No. 9,984,331.

(51) Int. Cl.
*G06N 5/04* (2006.01)
*G06F 16/29* (2019.01)
(Continued)

(52) U.S. Cl.
CPC .............. *G06N 5/04* (2013.01); *B60W 40/00* (2013.01); *G01S 19/14* (2013.01); *G06F 16/29* (2019.01);
(Continued)

(58) Field of Classification Search
None
See application file for complete search history.

(56) References Cited

U.S. PATENT DOCUMENTS 6,246,933 B1   6/2001  Baque
7,162,345 B2   1/2007  Matsunaga et al.
(Continued)

FOREIGN PATENT DOCUMENTS

CN    2043946      9/1989
JP    2001331896   1/2013
(Continued)

OTHER PUBLICATIONS

Hasanzadeh, et al., A Neuro-Fuzzy Application Proposal of an Individual Intelligent Driving Behavior Predictor Device, International Journal of Innovation and Applied Studies, 2013, pp. 612-620 (Year: 2013).*

(Continued)

*Primary Examiner* — Wilbert L Starks
(74) *Attorney, Agent, or Firm* — Schmeiser, Olsen & Watts; Michael A. Petrocelli

(57) ABSTRACT

A vehicle accident detection method and system is provided. The method includes receiving location coordinates associated with a location of an occurring vehicular accident. Data associated with possible causes of the vehicular accident is received from sensors. Traffic related rules associated with a geographical location are retrieved and analyzed with respect to the data. Parameters associated with at least one vehicle involved in the vehicular accident and a possible cause are determined via execution of programming logic and transmitted to additional systems. The possible cause for the vehicular accident is determined from all possible causes based on matching current and historical accident circumstances. Additionally, weighting factors may be available
(Continued)

and adjusted over time for accurate accident detection. A possible cause comprising a greatest weighting factor may be used to identify a most likely cause.

20 Claims, 3 Drawing Sheets

(51) Int. Cl.
G01S 19/14 (2010.01)
B60W 40/00 (2006.01)
G06K 9/00 (2006.01)
G06Q 40/08 (2012.01)
G06Q 50/30 (2012.01)
G08G 1/01 (2006.01)
G08G 1/04 (2006.01)
G08G 1/048 (2006.01)
G08G 1/052 (2006.01)
G08G 1/09 (2006.01)
G06K 9/62 (2006.01)
G06N 3/08 (2006.01)
G08G 1/0962 (2006.01)

(52) U.S. Cl.
CPC ..... *G06K 9/00791* (2013.01); *G06K 9/00832* (2013.01); *G06K 9/626* (2013.01); *G06N 5/046* (2013.01); *G06Q 40/08* (2013.01); *G06Q 50/30* (2013.01); *G08G 1/0112* (2013.01); *G08G 1/0129* (2013.01); *G08G 1/0141* (2013.01); *G08G 1/04* (2013.01); *G08G 1/048* (2013.01); *G08G 1/052* (2013.01); *G08G 1/093* (2013.01); *G06N 3/08* (2013.01); *G08G 1/09626* (2013.01)

(56) References Cited

U.S. PATENT DOCUMENTS

| 8,160,764 | B2 | 4/2012 | Choi et al. |
| 8,700,434 | B1 | 4/2014 | Delong et al. |
| 8,712,893 | B1 | 4/2014 | Brandmaier et al. |
| 8,731,977 | B1 | 5/2014 | Hardin et al. |
| 9,984,331 | B2* | 5/2018 | Cama .................. G08G 1/0141 |
| 2008/0252485 | A1 | 10/2008 | Lagassey |
| 2010/0030540 | A1 | 2/2010 | Choi et al. |
| 2010/0123779 | A1 | 5/2010 | Snyder et al. |
| 2014/0114502 | A1 | 4/2014 | Hugron et al. |
| 2016/0358081 | A1 | 12/2016 | Cama et al. |

FOREIGN PATENT DOCUMENTS

| JP | 2013003928 | 1/2013 |
| WO | 9600957 | 1/1996 |

OTHER PUBLICATIONS

IBM; Snapshot of situation for car accidents by utilization of GPS/Handy technology; IP.com; IP.com No. 000028171; Apr. 30, 2004; 2 pages.

Hasanzadeh, Kamyar et al.; A Neuro-Fuzzy Application Proposal of an Individual Intelligent Driving Behavior Predictor Device; International Journal of Innovation and Applied Sciences; vol. 4 No. 4; Dec. 2013; pp. 612-620.

Friedman, Mark J.; List of IBM Patents or Patent Applications Treated as Related; Mar. 6, 2018; 1 page.

* cited by examiner

AUTOMATED VEHICULAR ACCIDENT DETECTION

CROSS REFERENCE TO RELATED APPLICATIONS

This application is a continuation application claiming priority to Ser. No. 14/732,836 filed Jun. 8, 2015, now U.S. Pat. No. 9,984,331 issued May 29, 2018, the contents of which are hereby incorporated by reference.

FIELD

The present invention relates generally to a method for detecting vehicular accidents, and in particular to a method and associated automated system for retrieving, storing, and analyzing vehicular accident related information to accurately determine a cause for vehicular accidents.

BACKGROUND

Detection systems typically reduce issues resulting from automobile accidents by decreasing a response time with respect to emergency responders. Errors with respect to detecting or judging a violation, error, failure, or circumstance associated with a cause of an accident may unjustly penalize drivers, insurance companies, and any additional involved parties. The aforementioned errors may be associated with complex accident scenarios that if left to manual interpretation may be too complex for determining an accurate cause. For example, a multi-vehicle accident caused by, inter alia, a texting driver, a hot coffee spill, a deer cutting across a highway, etc.

Accordingly, there exists a need in the art to overcome at least some of the deficiencies and limitations described herein above.

SUMMARY

A first aspect of the invention provides a vehicle accident detection method comprising: receiving, by a computer processor of a computing system, location coordinates describing a location where a vehicular accident occurred; receiving, by the computer processor from a plurality of sensors, data associated with possible causes of the vehicular accident; retrieving, by the computer processor, traffic related rules associated with a geographical location of the location; analyzing, by the computer processor executing programming logic, the data with respect to the traffic related rules; determining, by the computer processor based on results of the analyzing, parameters associated with mechanical issues of the at least one vehicle involved in the vehicular accident; determining, by the computer processor based on results of the analyzing, distraction parameters associated with distraction related events for a driver of the at least one vehicle involved in the vehicular accident; and determining, by the computer processor based on results of the analyzing, the parameters, and the distraction parameters, a possible cause for the vehicular accident.

A second aspect of the invention provides a computing system comprising a computer processor coupled to a computer-readable memory unit, the memory unit comprising instructions that when executed by the computer processor implements a vehicle accident detection method comprising: receiving, by the computer processor, location coordinates describing a location where a vehicular accident occurred; receiving, by the computer processor from a plurality of sensors, data associated with possible causes of the vehicular accident; retrieving, by the computer processor, traffic related rules associated with a geographical location of the location; analyzing, by the computer processor executing programming logic, the data with respect to the traffic related rules; determining, by the computer processor based on results of the analyzing, parameters associated with mechanical issues of the at least one vehicle involved in the vehicular accident; determining, by the computer processor based on results of the analyzing, distraction parameters associated with distraction related events for a driver of the at least one vehicle involved in the vehicular accident; and determining, by the computer processor based on results of the analyzing, the parameters, and the distraction parameters, a possible cause for the vehicular accident.

A third aspect of the invention provides computer program product for vehicle accident detection, the computer program product comprising: one or more computer-readable, tangible storage devices; program instructions, stored on at least one of the one or more storage devices, to receive location coordinates describing a location where a vehicular accident occurred; program instructions, stored on at least one of the one or more storage devices, to receive from a plurality of sensors, data associated with possible causes of the vehicular accident; program instructions, stored on at least one of the one or more storage devices, to retrieve traffic related rules associated with a geographical location of said location; program instructions, stored on at least one of the one or more storage devices, to analyze the data with respect to the traffic related rules; program instructions, stored on at least one of the one or more storage devices, to determine parameters associated with mechanical issues of the at least one vehicle involved in the vehicular accident; program instructions, stored on at least one of the one or more storage devices, to determine distraction parameters associated with distraction related events for a driver of the at least one vehicle involved in the vehicular accident; and program instructions, stored on at least one of the one or more storage devices, to determine based on results of the analyses, the parameters, and the distraction parameters, a possible cause for the vehicular accident.

The present invention advantageously provides a simple method and associated system capable of reducing issues resulting from automobile accidents.

DETAILED DESCRIPTION

Figure 1:
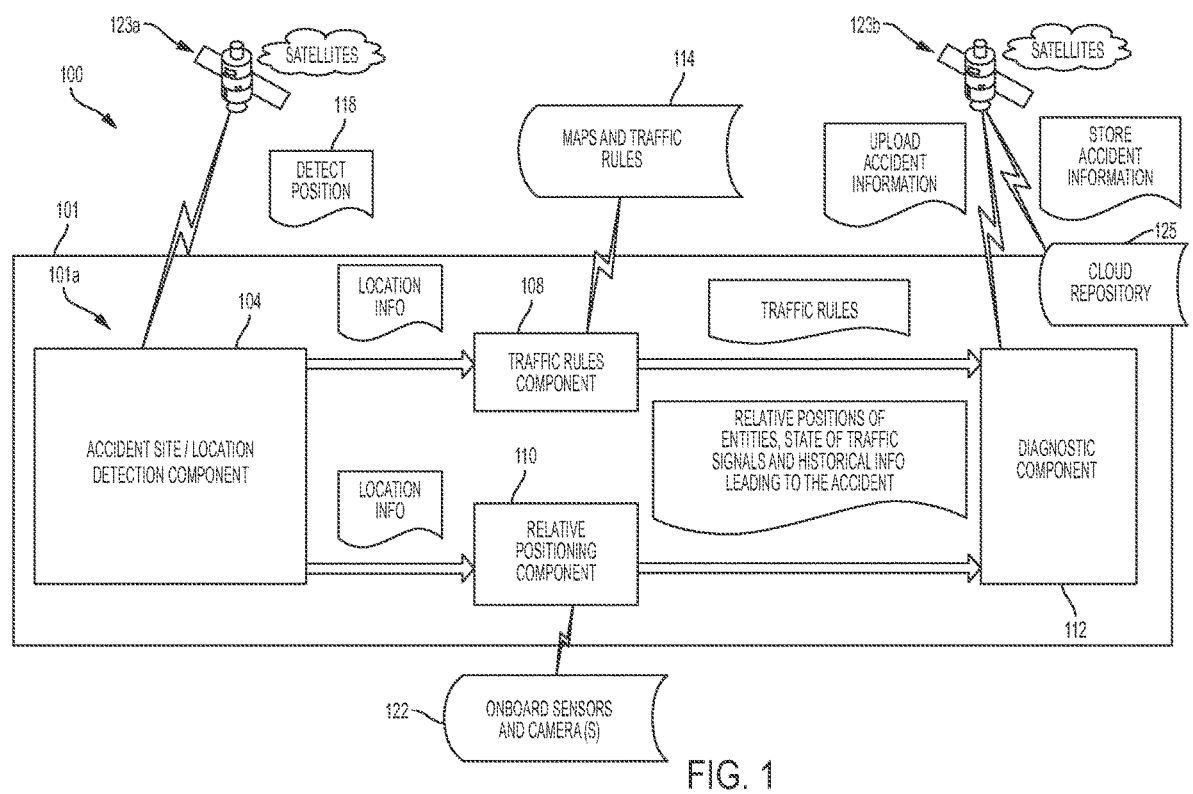
FIG. 1 illustrates a vehicular accident detection system, in accordance with embodiments of the present invention

FIG. 1 illustrates a vehicular accident detection system 100, in accordance with embodiments of the present invention. Sensors and cameras within automobiles may retrieve statistics such as speed, engine conditions, brake status, airbag deployment etc. The statistics are used to detect mechanical faults associated with an accident. System 100 analyzes the statistics applied via a set of traffic rules and co-relates the resulting information with a relative positioning with respect to additional entities involved in an accident to accurately pin-point a cause of the accident. A determined cause may benefit drivers, insurance agencies, law enforcement agencies, emergency responders, etc. and improve overall road safety. System 100 enables a method for predicting a cause of a vehicular accident. System 100 may detect a most likely cause and any respective liable parties with respect to a vehicular accident by:

1. Gathering: vehicular accident information including a location/site of the accident, a relative positioning of vehicles or objects involved in the accident, and traffic rules applicable to the accident site.
2. Applying business logic (e.g., language syntax, business rules, etc.) and weights to the aforementioned data in combination with relevant historical data to anticipate or predict an event based on historical patterns or algorithmic outcomes thereby accurately determining a cause and sequence of events that may have led to an accident.

Alternatively, system 100 enables a method for building predictive models with respect to vehicular accidents based on the aforementioned data and relevant historical data.

Additionally, system 100 enables a method for building and executing a self-learning algorithm to adjust weights used to determine a most likely cause and any liable parties with respect to the vehicular accident.

System 100 enables storage of automobile accident related information such as, inter alfa, a location, circumstances, causes, events with respect to an accident, rules applicable at a location of the accident, etc. Additionally, system 100 leverages onboard sensors, camera devices, and accident detection mechanisms to gather related information resulting in a determination of true causes and faults associated with an accident.

System 100 allows:

1. Detection of rules governing vehicular accident circumstances.
2. Generation of circumstance data for law enforcement officials, insurance agencies, and involved parties (i.e., involved in an accident) for proper fault detection, ticketing, claims, etc.
3. Automatic transmission of information and alerts to emergency response teams and hospitals
4. Linking to satellites for uploading accident-related information, images, passenger information to a repository for research and associated processes.
5. Improvement of driving mechanisms.
6. Improvement of training and driving lessons for drivers.
7. Improvement of road safety.

The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

System 100 comprises a vehicle 101 comprising a computing system 101*a* communicably connected to onboard sensors and a camera(s) 122, a maps and rules database(s) 114, satellites 123*a* and 123*b*, and a cloud repository 125. Computing system 101*a* comprises a location detection component 104, a traffic rules interpretation component 108, a relative positioning component 110, and a diagnostic component 112. Computing system 101*a* may be located internal to vehicle 100 as illustrated in FIG. 1. Alternatively, computing system 101*a* (or portions of computing system 101*a*) may be located external to vehicle 101. Additionally, computing system 101*a* may be located internal to and external to vehicle 101.

Location detection component 104 is configured to communicate with satellites 123*a* (e.g., a global positioning satellite (GPS), analyze associated geographical maps, and pin-point an exact location of a vehicular accident. Additionally, location detection component 104 stores information associated with a last known location of a vehicle. Diagnostic component 112 is configured to communicate with satellites 123*b* (e.g., a global positioning satellite (GPS).

Traffic rules interpretation component 108 is configured to interpret traffic rules in reference to maps (i.e., retrieved from maps and rules database(s) 114) as a set of rules in a specified language. The specified language comprises a set of defined symbols representing differing traffic signs. The defined symbols are used in combination with logical operators (e.g., a logical "NOT", "AND", "OR", etc. as described in example 2, infra) to define traffic rules with a specified precedence/weight applied to the rules applicable with respect to a specific circumstance. The maps and traffic rules are stored on servers (e.g., maps and rules database(s) 114) accessible to traffic rules interpretation component 108 via application programming interfaces (APIs) and request/response mechanisms over wireless Internet connections. The maps and rules may be periodically updated on the servers with current information. Additionally, traffic rules interpretation component 108 may locally cache the maps and the rules for offline use such that system 100 may operate in a geographical area comprising scattered network coverage.

Relative positioning component 110 communicatively connected to onboard sensors (e.g., blind spot detectors, etc.) and a (360-degree) camera 122 enables detection of: a relative positioning of entities involved in a vehicular accident, a state of traffic signals at the time and site of the accident, and historical information associated with a vehicle's movements/actions for a last specified time period (e.g., 30-60 seconds) of its drive path leading up to the accident. The 360-degree camera information provides geospatial insights as well as weather conditions that are ingested for effective cause analysis. Additional system sensors may be auto-activated by information from other sensors such as a proximity of vehicles involved or near to an accident. Onboard sensors and camera(s) 122 are configured to capture incidents within a specified timeframe leading up to the accident and at a point of impact. Relative positioning component 110 may additionally (and automatically) deploy airbags and apply brakes to prevent accidents in addition to participating in accident detection in cases when an accident does occur. An output generated by relative positioning component 110 may be generated when an accident is caused by human error. For example, a driver of a parked automobile does not signal a merge into a moving lane and initiates a driving process thereby failing to notice and yield to another automobile and colliding with the other automobile.

Diagnostic component 112 comprises a set of rules to diagnose circumstances and cause of an accident based on outputs from location detection component 104, traffic rules interpretation component 108, and a relative positioning component 110 at the time of an accident.

Location detection component 104, traffic rules interpretation component 108, relative positioning component 110, and diagnostic component 112 interact (at the time of an accident) as follows:

Upon activation of system 100, a location of a vehicle is known to location detection component 104 at all times. Therefore, a location of the vehicle (during involvement of an accident) is transmitted from location detection component 104 to traffic rules interpretation component 108 and relative positioning component 110. In response, traffic rules interpretation component 108 uses a specified language to interpret traffic rules applicable to each point on a traffic map. Additionally, traffic rules interpretation component 108 analyzes location information (retrieved from location detection component 104) to derive traffic rules applicable to the accident location. Traffic rules interpretation component 108 transmits the traffic rules to diagnostic component 112. In response, relative positioning component 110 determines a relative positioning of all entities involved in an accident based on data associated with onboard touch and visual sensors, a state of the traffic signals at a time and site of the accident, and historical information associated with vehicle movement/actions a last specified timeframe of a drive path leading up to the accident. This information is passed to diagnostic component 112. In response, diagnostic component 112 uses information retrieved from traffic rules interpretation component 108 and relative positioning component 110 to determine circumstances and a cause of the accident based on built-in logic.

The following examples illustrate implementation scenarios executed by vehicular accident detection system 100 with respect to a current accident situation.

Example 1

Example 1 is associated with an accident occurring at an intersection associated with a driver operating an automobile A overrunning a red light and impacted by an automobile B. In response, accident detection component 104 determines a location or site comprising coordinates (x, y, z) of the accident. Traffic rules component 108 outputs the following traffic rules applicable at the site of the accident:
1. Automobile A should have stopped as it was approaching a red light.
2. Automobile B was authorized to go as it was approaching a green light.

The following example rules are represented in the traffic language with a set of symbols and logical operators. For example, a symbol c represents an automobile, a symbol RL represents a red light, a symbol → represents the term approaching, a symbol GO represents that an automobile may proceed, and a symbol STOP represents that an automobile should stop. Therefore, a simple rule indicating that an automobile c should STOP when approaching a red light (RL) may be represented by the equation: c→RL=STOP. Likewise, a simple rule that an automobile c may GO when approaching a green light (GL) may be represented by the equation: c→GL=GO. In response, relative position component 110 is enabled to determine a relative positioning of automobiles A and B involved in the accident with respect to a location of the accident determined by the accident detection component 104 (i.e., accident detection component 104 determines a location/site comprising coordinates (x, y, z) of the accident). Additionally, relative position component 110 determines that the traffic light was red for automobile A but green for automobile B and that automobile A approached the accident site through the red traffic light as follows:

$A \rightarrow RL = GO$(automobile $A$ proceeded while approaching a Red Light)

$B \rightarrow GL = GO$(automobile $B$ proceeded while approaching a Green Light)

Diagnostic component 112 uses the information derived from traffic rules component 108 and relative position component 110 and compares determined accident circumstances and related information outputted from relative position component 110 with the traffic rules retrieved from maps and rules database(s) 114 and outputted from traffic rules component 108 as follows:

$A \rightarrow RL = GO$ violates $c \rightarrow RL = STOP$ traffic rule output from traffic rules component 108.

$B \rightarrow GL = GO$ is in compliance with $c \rightarrow GL = GO$ traffic rule output from traffic rules component 108.

Therefore, diagnostic component 112 determines that automobile A's driver was at fault.

Example 2

Example 2 describes an accident caused by human error with respect to traffic signals that are not explicitly involved. In this example, an accident occurs when a driver of a parked automobile X does not provide an adequate signal (in advance) to merge into a lane comprising moving traffic. The driver of parked automobile X does not detect and yield to an additional automobile Y proceeding forward in the same lane. The automobile Y is determined to be traveling below a posted speed limit but is unable to stop and prevent a collision when automobile X's driver suddenly initiates motion from a parked position without proper signaling or time to react. The accident appears to indicate that automobile Y has collided with automobile X from a side or rear section but the actual fault is with the driver of automobile X who did not sufficiently signal intentions in advance. Additionally, the driver of automobile X did not detect automobile Y suddenly initiating motion in a same lane from a parked position on the side of the road. System 100 automatically detects the correct scenario as follows:

Accident detection component 104 determines (e.g., from satellite based coordinates) a location or site comprising coordinates (x, y, z) of the accident. Traffic rules component 108 outputs the following traffic rules applicable at the site of the accident:
1. Automobile X should have:
  A. Enabled an indicator signal.
  B. Detected an automobile in the lane to the left.
  C. Initiated motion into the lane after enabling the signal and detecting the automobile to the left.
2. Automobile Y was authorized to move in the left lane below the posted speed limit.

The following example rules are represented in the traffic language via the following sub-rules indicated by the following equations:

$X \rightarrow$(LI AND NOCARONLEFT)=GO $X \rightarrow$(NOTLI OR YESAUTOMOBILEONLEFT) =YIELD Where:
Symbol LI represents that a left indicator signal is enabled.
Symbol NOAUTOMOBILEONLEFT represents that no automobile is present on the left.
Symbol YESAUTOMOBILEONLEFT represents that there is an automobile present on the left.
Symbol GO represents that an automobile may proceed.
Symbol YIELD represents that an automobile should yield.
Symbols NOT, AND, OR comprise logical operators.

Assuming that automobile X is attempting to merge into a lane to the left of its parked position, the rules state the following:

A first sub-rule states that: With a left indicator on (LI) and with no automobile to the left (NOAUTOMOBILEONLEFT), automobile X may initiate motion (i.e., merge into the moving lane).

A second sub-rule states that: With no left indicator on (NOTLI) or with an automobile to the left (YESAUTOMOBILEONLEFT), automobile X should YIELD (i.e., enable the indicator) and wait for the automobile Y to its left to pass before merging.

A second rule may be represented in the traffic language by the following rule:

$$Y \rightarrow (S<60)=GO$$

Where:

Symbol Y represent an automobile Y.

Symbol $S_Y$ represents a speed of the automobile Y.

Therefore, a rule states at point (x, y, z), if a speed of automobile Y is determined to be less than 60 miles/hr, automobile Y may proceed.

In response, relative positioning component 110 generates the following output:
1. A relative positioning and distance between automobiles X and Y involved in the accident.
2. Relative velocities of automobiles X and Y and if automobile Y was moving below the posted speed limit.
3. A time period indicating how long a left turn signal indicator for automobile X was enabled before automobile X attempted to merge into the lane.
4. A distance between the automobiles X and Y during the time period.

Diagnostic component 112 analyzes the information derived from traffic rules component 108 and relative position component 110 and compares determined accident circumstances and related information outputted from relative position component 110 with the traffic rules outputted from traffic rules component 108 as follows:

Diagnostic component 112 determines that based on the following factors: the time period (i.e., indicating how long a left turn signal indicator for automobile X was enabled before automobile X attempted to merge into the lane); a determined speed of automobile Y; and a determined distance of travel of automobile Y before colliding with automobile X, the driver of automobile Y was unable to react swiftly enough to apply the brakes and prevent the collision. Therefore, it is determined that the driver of automobile X is at fault for the accident as the driver of automobile X:
1. Did not enable the left turn signal indicator in a timely manner.
2. Did not detect automobile Y in the lane.
3. Initiated motion suddenly (from a parked position by the side of the road) thereby merging into the same lane as automobile Y.

The aforementioned rules and logic described, supra, may be extended to support complex country, state, and region-specific traffic rules as well as detection of complex multi-automobile accident scenarios. System 100 enables a method resulting in a determination with respect to causes for accidents.

Figure 2:
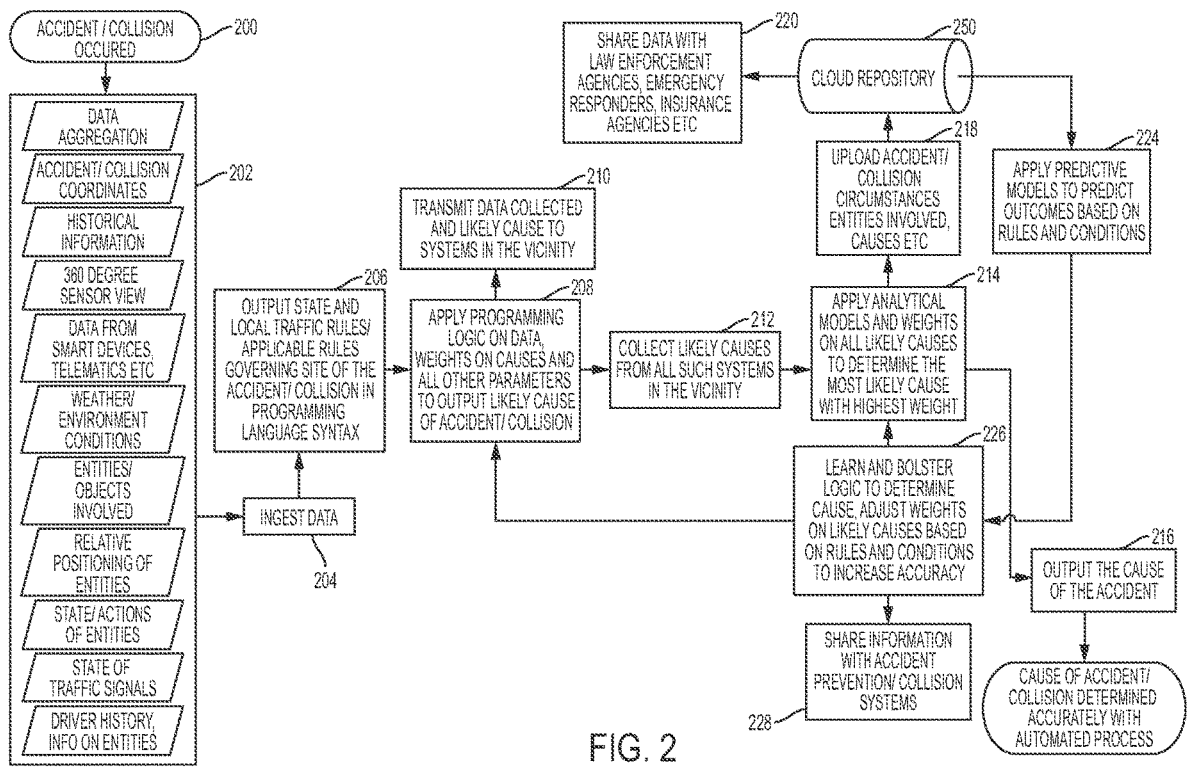
FIG. 2 illustrates an algorithm detailing a process flow executed by the system of FIG. 1 during a vehicular accident, in accordance with embodiments of the present invention.

FIG. 2 illustrates an algorithm detailing a process flow executed by system 100 of FIG. 1 during a vehicular accident, in accordance with embodiments of the present invention. Each of the steps in the algorithm of FIG. 2 may be enabled and executed in any order by a computer processor executing computer code. The algorithm enables a method for automatically detecting accidents and collisions via execution of logic and analytical models. In step 200, program code specifies that an accident has occurred. The program code may determine that the accident has occurred by, inter alia, analyzing data from sensors (e.g., speed sensors, motion sensors, pressure sensors, impact sensors, etc.), determining airbag deployment, etc. In response, program code retrieves and aggregates (in step 204) accident related data from a database 202 comprising data associated with past accidents, circumstances, and identified causes and associated weighting factors. For example, the accident related data may include, inter alia, determined accident/collision coordinates retrieved from a GPS device, etc. The database may include any type of physical or cloud based database. Database 202 may be periodically replicated into local systems. Table 1 below illustrates examples of accident related data as follows:

TABLE 1

| Circumstances | Circumstance Description | Derived Cause(s) | Weight | Most likely Cause |
| --- | --- | --- | --- | --- |
| Circumstance 1 | Night time Accident | Inexperienced Driver or Driver Error | 1 | Deer Moving Across Driving Path |
| Circumstance 2 | Deer related Accident | Drunk Driving | 3 | |
| Circumstance 3 | Experienced Driver Accident | Low Visibility | 5 | |
| Circumstance 4 | Driver with good Driving Record | Deer moving Across Driving Path | 7 | |
| Circumstance 5 | Below Legal Limit Alcohol Related | | | |
| Circumstance N | Utility Pole Related Accident | | | |

The accident related data may further include:
1. Historical information leading up to the accident such that each entity involved in the accident/collision will collect the historical information including systems installed around a site of the accident/collision.
2. A 360 degree sensor view around each entity involved in the accident/collision. The sensor view data may be collected by installed systems or entity related systems.
3. Data retrieved from smart devices, cameras, telematics systems, and onboard sensors (e.g., GPS receivers and accelerometers). The retrieved data may include data associated with driver activities, a speed of the vehicle/entity, and additional conditions within and surrounding the entities involved in the accident/collision. The retrieved data may be leveraged to:
   A. Determine if the driver was using a smartphone hands free or was texting.
   B. Determine if there was detour or traffic congestion.
4. Weather/environment conditions data that may be leveraged to:
   A. Determine if precipitation is/was present.
   B. Calculate a coefficient of friction and determine if loss of traction was a factor.
   C. If on a freeway overpass that is banked, determine a safe velocity given precipitation.
   D. Determine if there was a speed limit override given the weather conditions.
5. Data to determine entities/objects involved in the accident/collision including vehicles/entities that were driven and others that were part of the accident/collision. For example, a utility pole, a fallen tree due to bad weather conditions, etc. The aforementioned data may be leveraged to:

A. Examine a 360 view camera feed to determine if road debris or falling objects from a vehicle in a front position were present thereby causing a driver to suddenly change a lane.

B. Calculate a number of seconds to impact and for driver to safely switch lanes.

6. Data to determine relative positions of entities that may be held responsible for the accident/collision (e.g., vehicles) along with other objects involved in the accident/collision (e.g., trees, fences, utility poles, deer, etc.).

7. Data to determine a state and associated actions of the entities involved in the accident/collision. The aforementioned data may be leveraged to determine the following:

A. Evaluate if there was any attempt to avoid the accident.

8. Data to determine a state of traffic signals or signs determining the applicable rules at the accident/collision site.

9. Data to determine additional information associated with the entities and persons involved (in the case of auto accidents), pictures of the drivers, if the driver was texting, whether air bags were deployed, driver history and records, past history of the entities involved, known problems with makes and models, etc.

In step 206, program code determines and outputs state and local traffic rules/applicable rules governing the site of the accident/collision in the form of a specified language with syntax. The following usage example illustrates the rules interpreted with the specified language syntax:

If the rules are available, then program code fetches the rules. The available rules are interpreted in the language as follows: C1→RL=STOP. The aforementioned rule states that an entity C1 should stop with respect to a red light. A coefficient of friction is calculated and it is determined if loss of traction was a factor in the accident. Additional rules may be stated with considerations with respect to mathematical formulae as follows: C2→(SC2<60)=GO. This rule states that at coordinates (x, y, z), if a speed of vehicle C2 is less than 60 miles/hr, the vehicle C2 may proceed. If the rules are not available then new rules are ingested. The rules are continuously ingested into the system and modified in accordance with past and present accident related data.

In step 208, program code applies programming logic to the aforementioned data. Additionally, program code applies: data, weighting factors (as illustrated in tables 1 and 2) to accident causes, and additional parameters resulting in an output specifying a likely cause of the accident/collision. The weighting factors may be associated with and applied based on various parameters such as, inter alia, excessive speed, weather related issues such as snow, mechanical failure, etc. The following usage example illustrates the rules interpreted with the specified language syntax:

An AND logical operator is enabled to determine a violation or cause based on an actual circumstance at the site of the accident/collision and an associated traffic rule. For example, an actual circumstance based on data collected from site was C1→RL=GO equaling true or 1. Therefore, it is determined that vehicle C1 initiated motion with respect to a red light. The logical operator AND is applied to the traffic rule C1→RL=STOP equaling true or 1 (i.e., (C1→RL=GO). (C1→RL=STOP), i.e. 1. 1, 1). Therefore, the system indicates that the vehicle C1 has violated a traffic rule and identifies that as a likely cause of the accident. Additionally, additional parameters such as a coefficient of friction are calculated and it is determined if a loss of traction was a factor in the accident. The logic may additionally consider an identified slippery road, derive the coefficient of friction, and identify the aforementioned factors as likely causes. A slippery road may be identified by antilock braking system and traction control system within the vehicle. Additionally, historical data and specified circumstances associated with the accident may be analyzed. A maximum coefficient of friction ($\mu$) may be determined based on longitudinal, side, and normal forces acting on the tires of the automobile. Based on x, y, z factors derived from the data at the site of the accident, each system will identify a most likely cause of the accident based on logic and the weights with respect to each cause. A higher weight (based on the circumstances) is determined to comprise a more likely cause.

In step 210, program code transmits the aforementioned data to additional accident detection systems. In step 212, program code collects the aforementioned data from the additional accident detection systems. The additional accident detection systems may display different causes. Information associated with past accidents/collisions, accident/collision locations, terrain, weather conditions, etc. at the accident location as well as determined causes from legal and other perspectives may be ingested into the system. Additionally, additional relevant data associated with the accidents/collisions and likely causes and associated weighting factors defining a probability with respect to each cause are ingested into the system. The weighting factors may be associated with excessive speed, snow, mechanical failure, etc. and may be considered in addition to further parameters such as a driver's driving history and records, prior driving issues, traffic tickets, etc. In step 214, program code leverages analytical models with respect to the data to accurately determine a most probable (highest weight/score) cause of the accident/collision based on the data collected with respect to a specified accident/collision. For example, an accident involving an experienced driver who has not had an incident within the past five years and is driving a same vehicle during an accident may have caused an accident due to slippery conditions associated with snow even though he/she was driving below the maximum speed limit. An additional example may specify that a driver accidentally spilled his coffee and burnt himself while texting and driving, lost focus on the road, and caused a multi automobile accident due to abrupt braking. A further example may specify that during an active deer season, an accident in which a deer and an experienced safe driver's vehicle were involved was a most likely cause due to the deer abruptly cutting across a path of the vehicle without adequate time for braking in an area with no deer warning sign. Therefore, based on the data stored in the database 202, likely accident causes are determined by each system in the vicinity of the accident site as illustrated in table 2 as follows:

TABLE 2

| Derived Likely Cause(s) | Weight | Most Likely Cause(s) |
| --- | --- | --- |
| Inexperienced Driver or Driver Error | 1 | Deer into Oncoming Path |
| Drunk Driving | 3 | |
| Night Visibility | 5 | |
| Deer in Oncoming Path | 7 | |

In step 216, a most likely cause for the accident is displayed via an output display terminal. In step 218, program code uploads accident/collision circumstances, entities involved, and causes for the accident to a Cloud repository 250 for research and additional prediction leveraging predictive models. In step 220, program code transmits notifications (associated with the uploaded data of step 218) to law enforcement agencies, emergency responders, insurance agencies etc. In step 224, program code modifies differing associated parameters and rules to predict outcomes of accidents/collisions between two or more entities. As additional accidents are analyzed and associated causes are detected, related data may be ingested into database 202 thereby predicting accidents if it is determined that circumstances Cir1, Cir2 . . . , CirN are prevalent at a location of the accident. Therefore, based on cause detection and circumstances of past accidents, the weights associated with causes (e.g., in table 1, supra) are modified accordingly. Circumstances with respect to every new accident are matched along with program logic to predict a likely cause of an accident. Determined likely causes may be further analyzed based on all circumstances collected and a most likely cause may be determined based on a highest weight (e.g., from table 1). Over time, data with respect to the circumstances evolve and associated weights are modified for more accurate cause predictions. The following example 3 illustrates the aforementioned self-learning feature for determining accident causes.

Example 3

Example 2 describes a scenario comprising automobiles C1 and C2 involved in an accident. In response to the accident, a system residing within automobile C1 (e.g., a system such as system 101a of FIG. 1) determines that based on derived circumstances Cir1, Cir2, Cir3 and Cir4, likely causes for the accident comprise causes cs1, cs2, and cs3. The causes cs1, cs2, and cs3 are analyzed with respect to applied weighting factors (e.g., derived from a weighting factor table) and a most likely cause is determined to comprise cause cs3. Additionally, in response to the accident, a system residing within automobile C2 C1 (e.g., a system such as system 101a of FIG. 1) determines based on circumstances Cir1, Cir2, Cir4, and Cir5, likely causes for the accident comprise causes cs2, cs3, and cs4. The causes cs1, cs2, and cs4 are analyzed with respect to applied weighting factors (e.g., derived from a weighting factor table) and a most likely cause is determined to comprise cause cs4. Based on the aforementioned analysis from the systems of automobiles C1 and C2, a new cause prediction rule is derived based on circumstances Cir1, Cir2, Cir3, Cir4, and Cir5 and a most likely cause with a highest weight comprises cause cs4 if the weight of cs4 is greater than cause cs3. Therefore, if another similar accident occurs and circumstances Cir1, Cir3, Cir4 and Cir5 are determined, it may be predicted (based on evaluating the new cause prediction rule) that cause cs4 comprises a likely cause. Additionally, a prediction in terms of weight with respect to other likely causes may be derived and a weight associated with circumstance cs4 may be adjusted to reflect a cause with respect to a set or subset of circumstances. For example, if circumstances Cir1, Cir2, Cir3, and Cir4 comprise circumstances associated with an accident and a cause cs3 comprises a higher weight than cause cs4, it may be determined that cause cs3 comprises most likely cause. However if circumstances Cir1, Cir2, Cir3, Cir4, and Cir5 comprise circumstances associated with an accident and a cause cs4 comprises a higher weight than cs3, it may be determined that cause cs4 comprises a most likely cause. Therefore, the aforementioned process results in a more accurate accident prediction based on a certain set of circumstances determined overtime with respect to a learning process, additional data, and weight adjustments. Therefore, it may be determined that there is a chance (with varying degrees of probability) for an accident/collision occurring due to one of the likely causes that have contributed to the accidents/collisions under those circumstances.

In step 226, program code learns and bolsters logic to determine accident causes, adjust weights with respect to likely causes based on rules and conditions to increase accuracy. The data ingested from past accidents may enable an adjustment with respect to the weights applied to the causes based on circumstances for accurate detection and prediction. In step 228, program code shares the data with accident prevention systems thereby enabling a process for preventing a circumstance n from occurring if it is determined that (n–1) circumstances out of the n circumstances that have caused numerous accidents/collisions in the past are existent at a location at a specified point in time. Therefore, an accident/collision may be prevented.

Figure 3:
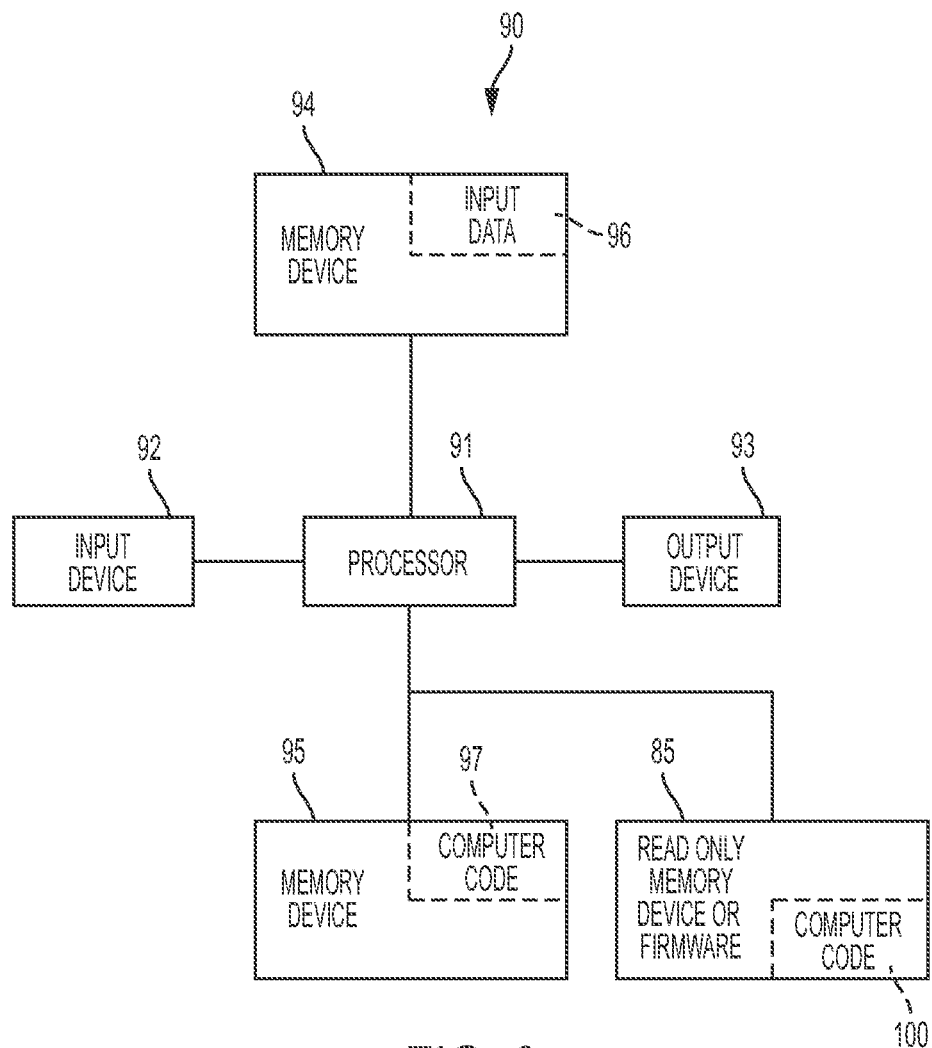
FIG. 3 illustrates a computer apparatus for retrieving, storing, and analyzing vehicular accident related information to determine a cause for vehicular accidents, in accordance with embodiments of the present invention.

FIG. 3 illustrates a computer apparatus 90 for retrieving, storing, and analyzing vehicular accident related information to determine a cause for vehicular accidents, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for retrieving, storing, and analyzing vehicular accident related information to determine a cause for vehicular accidents. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may include the algorithms of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to retrieve, store, and analyze vehicular accident related information to determine a cause for vehicular accidents. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for retrieving, storing, and analyzing vehicular accident related information to determine a cause for vehicular accidents. In another embodiment, the invention provides a business method that performs the process steps of the invention on a subscription, advertising, and/or fee basis. That is, a service supplier, such as a Solution Integrator, could offer to retrieve, store, and analyze vehicular accident related information to determine a cause for vehicular accidents. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle accident detection and driving mechanism improvement method comprising:
automatically deploying, by a computer processor of a computing system enabling a relative positioning circuit of a vehicle, airbags of said vehicle in response to detecting a vehicular accident involving said vehicle, wherein said relative positioning circuit comprises programmable logic circuitry utilizing state information of computer readable program instructions to personalize electronic circuitry of said relative positioning circuit;
automatically applying, by said computer processor enabling said relative positioning circuit of said vehicle, a braking mechanism of said vehicle in response to detecting said vehicular accident involving said vehicle;
receiving, by said computer processor from a first plurality of sensors, data associated with possible causes of said vehicular accident, wherein said first plurality of sensors automatically detect and convert to said data: engine conditions of said vehicle, a brake status of said vehicle, and an airbag deployment of said vehicle;
automatically activating, by said computer processor in combination with said first plurality of sensors, a second plurality of sensors capturing time based incidents associated with a point of impact of said vehicle during said vehicular accident;
analyzing, by said computer processor executing programming logic, said data and said time based incidents with respect to traffic related rules associated with a geographical location of a location where said vehicular accident occurred;
determining, by said computer processor based on results of said analyzing, parameters associated with mechanical issues of said vehicle involved in said vehicular accident;
determining, by said computer processor based on results of said analyzing, distraction parameters associated with distraction related events for a driver of said vehicle involved in said vehicular accident;
determining, by said computer processor executing a diagnostic circuit diagnosing results of said analyzing, said parameters, and said distraction parameters, a possible cause for said vehicular accident, wherein said diagnostic circuit comprises programmable logic circuitry utilizing state information of computer readable program instructions to personalize electronic circuitry of said diagnostic circuit;
generating, by said processor based on said possible cause for said vehicular accident, self learning software code configured to automatically deploy mechanical systems of said vehicle for preventing an additional vehicular accident and improving mechanisms of said vehicle; and
automatically deploying, by said computer processor executing said self learning software code, said mechanical systems of said vehicle in response to detection of a possible vehicular accident involving said vehicle.

2. The method of claim 1, further comprising:
retrieving, by said computer processor, additional determined possible causes for said vehicular accident;
additionally analyzing, by said computer processor, said possible cause with respect to said additional determined possible causes;
applying, by said computer processor based on results of said additionally analyzing, weighting factors to said possible cause and said additional determined possible causes;
determining, by said computer processor based on a highest weighting factor of said weighting factors, a determined cause for said vehicular accident; and
presenting, by said computer processor via a display system, said determined cause for said vehicular accident.

3. The method of claim 2, wherein said additional determined possible causes comprise causes selected from the group consisting of previous accidents associated with said driver of said at least one vehicle, weather and terrain related conditions, and previous driver related records of said driver.

4. The method of claim 2, further comprising:
executing, by said computer processor, predictive modeling algorithms with respect to said determined cause for said vehicular accident and additional determined causes for additional vehicular accidents previously occurring at said location;
generating, by said computer processor based on an application of results of said executing said predictive modeling algorithms, modified programming logic associated with said programming logic; and executing, by said computer processor, said modified programming logic with respect to related data associated with possible causes of an additional vehicular accident.

5. The method of claim 4, further comprising:

predicting, by said computer processor based on said results of said executing said programming logic, results of said executing said predictive modeling algorithms, and results of said executing said modified programming logic, possible future vehicular accidents at said location.

6. The method of claim 4, further comprising:

predicting, by said computer processor based on said results of said executing said programming logic, results of said executing said predictive modeling algorithms, and results of said executing said modified programming logic, possible future vehicular accidents comprising similar circumstances with respect to said vehicular accident.

7. The method of claim 1, wherein said data associated with said vehicular accident comprises data selected from the group consisting of historical data associated with said location, sensor data from sensors located adjacent to said location, smart phone/GP S related data, environmental condition data, data retrieved from systems of said at least one vehicle, traffic signal data, and data defining accident circumstances.

8. The method of claim 1, wherein said parameters comprise a determined coefficient of friction between tires of said at least one vehicle and a driving surface.

9. The method of claim 1, wherein said distraction parameters comprise distraction based parameters selected from the group consisting of electronics based distraction parameters and food/drink based distraction parameters.

10. The method of claim 1, further comprising:

providing at least one support service for at least one of creating, integrating, hosting, maintaining, and deploying computer-readable code in the computing system, said code being executed by the computer processor to implement said receiving said location coordinates, said receiving said data, said analyzing, said determining said parameters, and said determining said possible cause.

11. A computing system comprising a computer processor coupled to a computer-readable memory unit, said memory unit comprising instructions that when executed by the computer processor implements a vehicle accident detection and driving mechanism improvement method comprising:

automatically deploying, by said computer processor enabling a relative positioning circuit of a vehicle, airbags of said vehicle in response to detecting a vehicular accident involving said vehicle, wherein said relative positioning circuit comprises programmable logic circuitry utilizing state information of computer readable program instructions to personalize electronic circuitry of said relative positioning circuit;

automatically applying, by said computer processor enabling said relative positioning circuit of said vehicle, a braking mechanism of said vehicle in response to detecting said vehicular accident involving said vehicle;

receiving, by said computer processor from a first plurality of sensors, data associated with possible causes of said vehicular accident, wherein said first plurality of sensors automatically detect and convert to said data: engine conditions of said vehicle, a brake status of said vehicle, and an airbag deployment of said vehicle;

automatically activating, by said computer processor in combination with said first plurality of sensors, a second plurality of sensors capturing time based incidents associated with a point of impact of said vehicle during said vehicular accident;

analyzing, by said computer processor executing programming logic, said data and said time based incidents with respect to traffic related rules associated with a geographical location of a location where said vehicular accident occurred;

determining, by said computer processor based on results of said analyzing, parameters associated with mechanical issues of said vehicle involved in said vehicular accident;

determining, by said computer processor based on results of said analyzing, distraction parameters associated with distraction related events for a driver of said vehicle involved in said vehicular accident;

determining, by said computer processor executing a diagnostic circuit diagnosing results of said analyzing, said parameters, and said distraction parameters, a possible cause for said vehicular accident, wherein said diagnostic circuit comprises programmable logic circuitry utilizing state information of computer readable program instructions to personalize electronic circuitry of said diagnostic circuit;

generating, by said processor based on said possible cause for said vehicular accident, self learning software code configured to automatically deploy mechanical systems of said vehicle for preventing an additional vehicular accident and improving mechanisms of said vehicle; and automatically deploying, by said computer processor executing said self learning software code, said mechanical systems of said vehicle in response to detection of a possible vehicular accident involving said vehicle.

12. The computing system of claim 11, wherein said method further comprises:

retrieving, by said computer processor, additional determined possible causes for said vehicular accident;

additionally analyzing, by said computer processor, said possible cause with respect to said additional determined possible causes;

applying, by said computer processor based on results of said additionally analyzing, weighting factors to said possible cause and said additional determined possible causes;

determining, by said computer processor based on a highest weighting factor of said weighting factors, a determined cause for said vehicular accident; and presenting, by said computer processor via a display system, said determined cause for said vehicular accident.

13. The computing system of claim 12, wherein said method further comprises:

wherein said additional determined possible causes comprise causes selected from the group consisting of previous accidents associated with said driver of said at least one vehicle, weather and terrain related conditions, and previous driver related records of said driver.

14. The computing system of claim 12, wherein said method further comprises:

executing, by said computer processor, predictive modeling algorithms with respect to said determined cause for said vehicular accident and additional determined causes for additional vehicular accidents previously occurring at said location;

generating, by said computer processor based on an application of results of said executing said predictive modeling algorithms, modified programming logic associated with said programming logic; and executing, by said computer processor, said modified programming logic with respect to related data associated with possible causes of an additional vehicular accident.

15. The computing system of claim 14, wherein said method further comprises:

predicting, by said computer processor based on said results of said executing said programming logic, results of said executing said predictive modeling algorithms, and results of said executing said modified programming logic, possible future vehicular accidents at said location.

16. The computing system of claim 14, wherein said method further comprises:

predicting, by said computer processor based on said results of said executing said programming logic, results of said executing said predictive modeling algorithms, and results of said executing said modified programming logic, possible future vehicular accidents comprising similar circumstances with respect to said vehicular accident.

17. The computing system of claim 11, wherein said data associated with said vehicular accident comprises data selected from the group consisting of historical data associated with said location, sensor data from sensors located adjacent to said location, smart phone/GPS related data, environmental condition data, data retrieved from systems of said at least one vehicle, traffic signal data, and data defining accident circumstances.

18. The computing system of claim 11, wherein said parameters comprise a determined coefficient of friction between tires of said at least one vehicle and a driving surface.

19. The computing system of claim 11, wherein said distraction parameters comprise distraction based parameters selected from the group consisting of electronics based distraction parameters and food/drink based distraction parameters.

20. A computer program product for vehicle accident detection and driving mechanism improvement, the computer program product comprising:

one or more computer-readable, tangible storage devices;

program instructions, stored on at least one of the one or more storage devices, to automatically deploy, via a relative positioning circuit of a vehicle, airbags of said vehicle in response to detecting a vehicular accident involving said vehicle, wherein said relative positioning circuit comprises programmable logic circuitry utilizing state information of computer readable program instructions to personalize electronic circuitry of said relative positioning circuit;

program instructions, stored on at least one of the one or more storage devices, to automatically apply, via said relative positioning circuit of said vehicle, a braking mechanism of said vehicle in response to detecting said vehicular accident involving said vehicle;

program instructions, stored on at least one of the one or more storage devices, to receive from a first plurality of sensors, data associated with possible causes of said vehicular accident, wherein said first plurality of sensors automatically detect and convert to said data: engine conditions of said vehicle, a brake status of said vehicle, and an airbag deployment of said vehicle;

program instructions, stored on at least one of the one or more storage devices, to automatically activate, via said first plurality of sensors, a second plurality of sensors capturing time based incidents associated with a point of impact of said vehicle during said vehicular accident;

program instructions, stored on at least one of the one or more storage devices, to analyze said data and said time based incidents with respect to traffic related rules associated with a geographical location of a location where said vehicular accident occurred;

program instructions, stored on at least one of the one or more storage devices, to determine parameters associated with mechanical issues of said vehicle involved in said vehicular accident;

program instructions, stored on at least one of the one or more storage devices, to determine distraction parameters associated with distraction related events for a driver of said vehicle involved in said vehicular accident;

program instructions, stored on at least one of the one or more storage devices, to determine, via execution of a diagnostic circuit diagnosing results of the analyses, the parameters, and the distraction parameters, a possible cause for said vehicular accident, wherein said diagnostic circuit comprises programmable logic circuitry utilizing state information of computer readable program instructions to personalize electronic circuitry of said diagnostic circuit;

program instructions, stored on at least one of the one or more storage devices, to generate, based on said possible cause for said vehicular accident, self learning software code configured to automatically deploy mechanical systems of said vehicle for preventing an additional vehicular accident and improving mechanisms of said vehicle; and program instructions, stored on at least one of the one or more storage devices, to automatically deploy, via execution of said self learning software code, said mechanical systems of said vehicle in response to detection of a possible vehicular accident involving said vehicle.

* * * * *